United States Patent [19]
Reed

[11] Patent Number: 4,803,897
[45] Date of Patent: Feb. 14, 1989

[54] DRIVE SYSTEM FOR TRACK-LAYING VEHICLES

[75] Inventor: Bradley O. Reed, Pittsfield, Mass.

[73] Assignee: General Electric Company, Pittsfield, Mass.

[21] Appl. No.: 98,164

[22] Filed: Sep. 18, 1987

[51] Int. Cl.⁴ .............................................. F16H 37/06
[52] U.S. Cl. ..................................... 74/720.5; 74/675
[58] Field of Search ...................... 74/675, 720, 720.5, 74/682; 180/6.44

[56] References Cited
U.S. PATENT DOCUMENTS 3,383,953 5/1968 Christenson ...................... 74/720.5
3,799,284 3/1974 Hender ............................... 74/675 X
4,485,691 12/1984 Reed ................................. 74/720.5 X
4,614,131 9/1986 Hall, III ............................ 74/720.5

Primary Examiner—Dirk Wright
Attorney, Agent, or Firm—Bailin L. Kuch; Robert A. Cahill

[57] ABSTRACT

A drive system for track-laying vehicles utilizes a pair of separate and independent motors to drive a multi-range, infinitely variable steering transmission pursuant to developing two track driving transmission outputs. The transmission includes a pair of interconnected output planetary gears sets which are separately driven by the two motors to develop first range forward and reverse propulsion and steering power at the transmission outputs as sun to carrier reductions. The transmission is shiftable into a second, higher speed range, wherein the two motor outputs are additional combined in one of the output planetary gear sets uniquely constructed to produce second range forward propulsion and steering power, as well as steer cancallation at the transmission outputs.

19 Claims, 2 Drawing Sheets

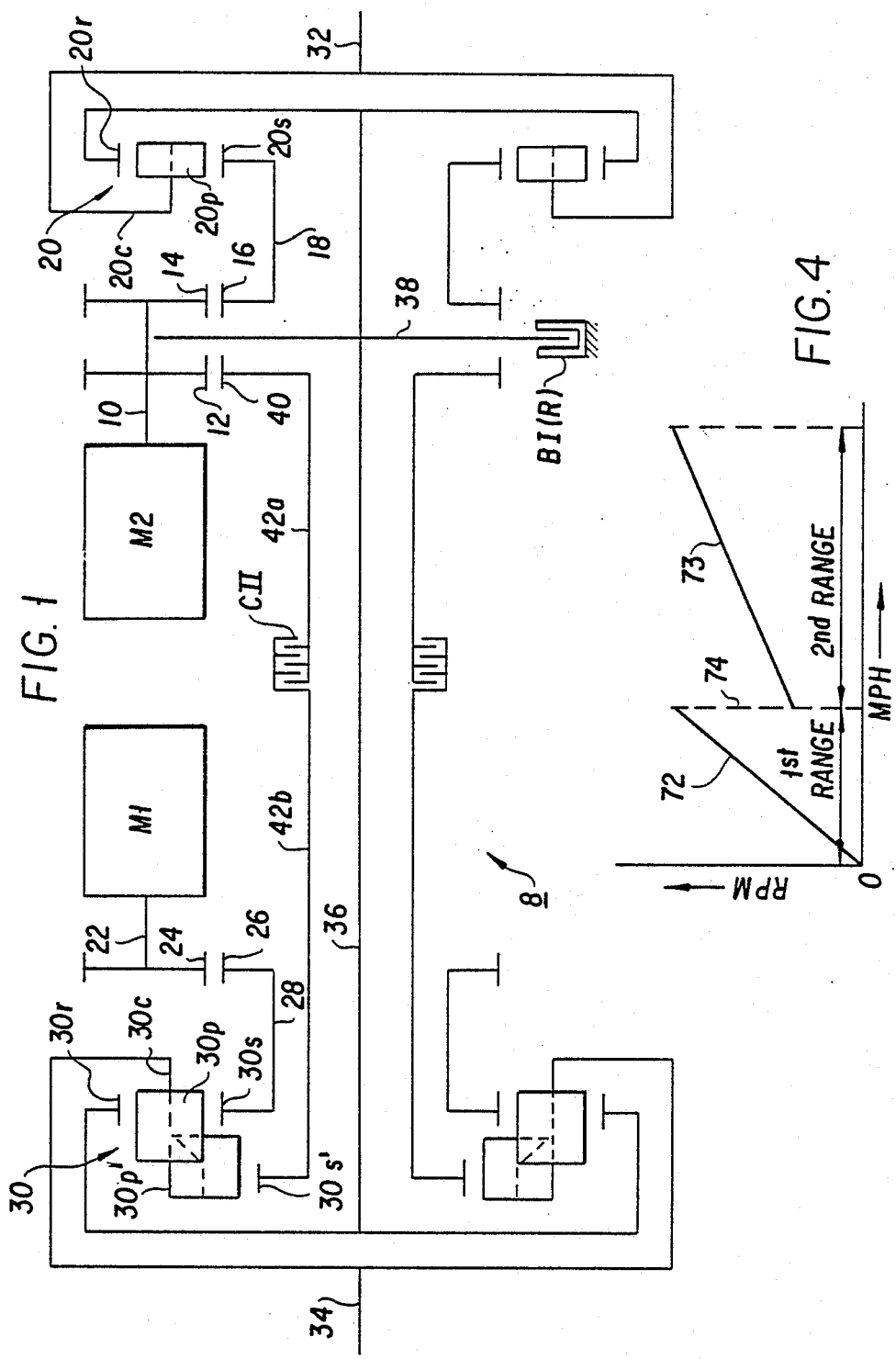

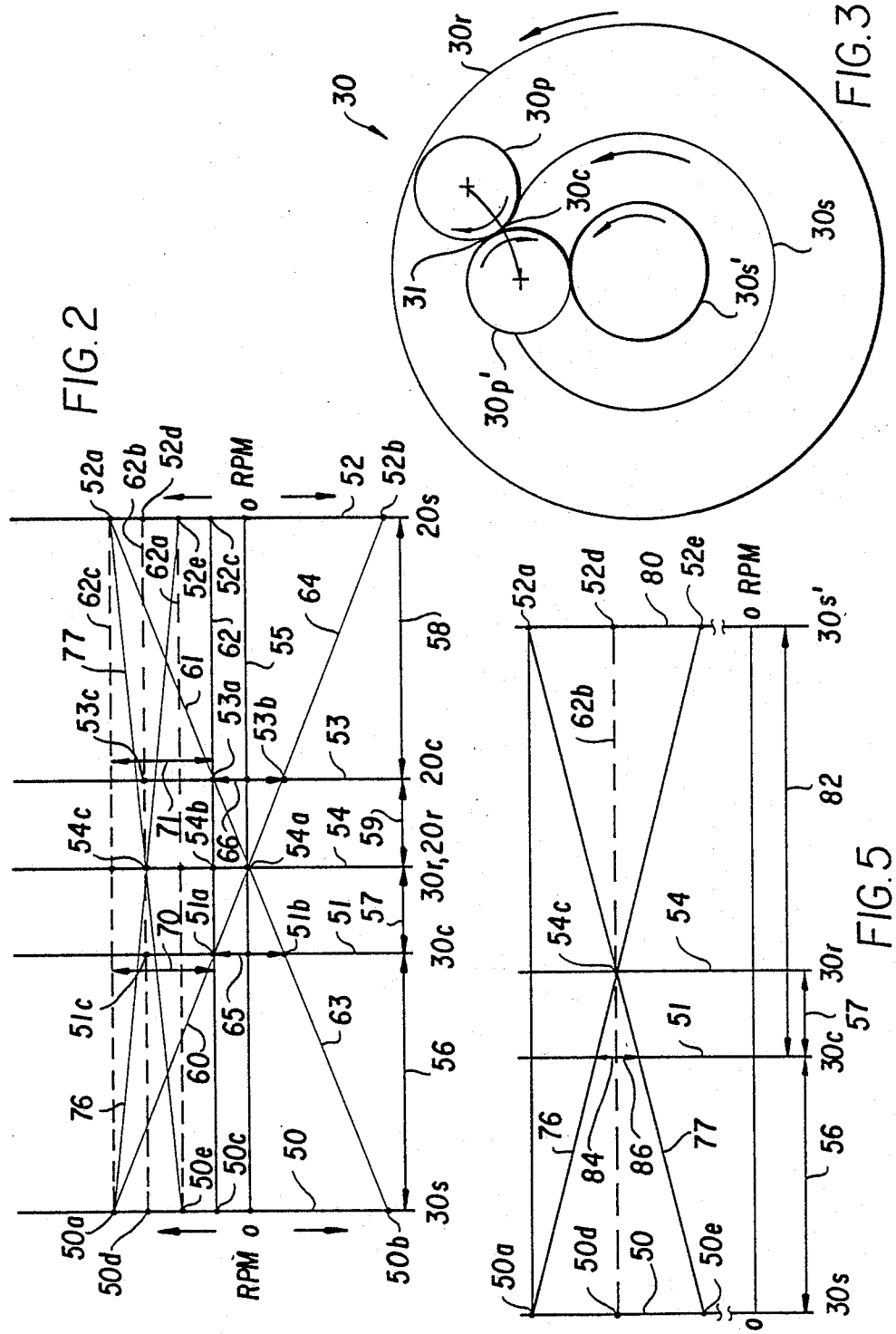

DRIVE SYSTEM FOR TRACK-LAYING VEHICLES

In state of the art track-laying vehicles, such as army tanks, a transmission is driven typically at a constant speed by a suitable prime mover, such as a diesel or gas turbine engine, to develop a pair of outputs for separately driving the left and right vehicle tracks. The transmission is shifted through its various speed ranges to achieve a desired maximum vehicle speed. To steer the vehicle, the current practice is to impose a speed differential on the two tracks by speeding up one track by a selected increment while concurrently slowing down the speed of the other track by the same increment. This applies while the vehicle is moving in a straight path. If the vehicle is not, then a steer is accomplished by driving the two tracks in opposite directions at equal speeds. If, for example, the maximum track speed differential to effect a steer is in the range of from five to twenty miles per hour, then one track is speeded up from two and one-half to ten miles per hour, while the other track is slowed down (or speeded up in the reverse direction) from two and one-half to ten miles per hour. If the maximum vehicle speed is, for example, forty miles per hour, then the vehicle drive system must provide at least four times as much speed coverage to propel the vehicle in a straight path up to maximum speed as it does to steer the vehicle. Since maximum torque requirements for steer and straight line propulsion are typically nearly equal, the total power spectrum, usually referred to as corner horsepower, is at least four times greater for propulsion than for steer in the above example.

It is accordingly an object of the present invention to provide a drive system for track-laying vehicles, wherein the system prime mover is more closely matched to the dissimilar load requirements for straight line propulsion and steer.

A further object is to provide a drive system of the above-character, wherein more efficient utilization of prime mover power is achieved.

Another object is to provide a drive system of the above-character, wherein steer requirements are satisfied throughout the power spectrum without unduly sacrificing propulsion requirements.

Yet another object of the present invention is to provide a drive system of the above-character which is simple in construction, inexpensive to manufacture, and efficient in operation.

Other objects will in part be obvious and in part appear hereinafter.

SUMMARY OF THE INVENTION

In accordance with the present invention, there is provided a drive system for track-laying vehicles which utilizes as its prime mover source a pair of independently controllable power sources or motors whose power capacities are selected primarily to satisfy steering speed and torque requirements. As a result, the power capacity of each motor may be considerably less than one-half the power capacity of the single prime mover heretofore utilized. Each such relatively small motor is connected via a novel steering transmission to drive a different one of the vehicle tracks at equal speeds in a first forward and reverse propulsion range and at differential speeds to effect steering. The transmission is shiftable from this first range into a higher speed range for straight line propulsion without changing the speed and torque ratios for steering at increased vehicle speeds. Thu, steering power requirements take precidence over propulsion power requirements in the higher speed range to prevent the motors from being overloading during a steering maneuver. The respective steering power paths from the motors to the vehicle tracks are continuous, i.e., no clutches, even during range shifting, and thus steering capability is always available.

The invention accordingly comprises the features of construction, combination of elements and arrangement of parts which will be exemplified in the construction hereinafter set forth, and the scope of the invention will be indicated in the claims.

For a fuller understanding of the nature and objects of the present invention, reference may be had to the following detailed description taken in conjunction with the accompanying drawing, in which:

FIG. 1 is a schematic illustration of a drive system constructed in accordance with the present invention for driving a track-laying vehicle;

FIG. 2 is a graph illustrating the coordinated operations of the left and right output planetary gear sets schematically illustrated in FIG. 1;

FIG. 3 is a simplified axial view of the left output planetary gear set in FIG. 1;

FIG. 4 is a graph illustrating the speed pattern of the prime mover motors of FIG. 1 for forward propulsion in the first and second ranges; and FIG. 5 is a graph illustrating the operation of the left output planetary gear set in the transmission schematically illustrated in FIG. 1.

DETAIL DESCRIPTION OF THE INVENTION

The drive system of the present invention is illustrated schematically in FIG. 1 as including a prime mover constituted by a pair of motors M1 and M2 of any suitable type, such as electric motors, hydraulic motors, etc., for driving a transmission, generally indicated at 8. The output of motor M2 appearing on shaft 10 drives a pair of pinion gears 12 and 14; the latter engaging a spur gear 16 affixed on a sleeve shaft 18. Also affixed to this sleeve shaft is a sun gear 20s of a right output planetary gear set, generally indicated at 20.

The output of motor M1 on shaft 22 drives a pinion gear 24 which meshes with a spur gear 26 affixed to a sleeve shaft 28 of transmission 8. Also affixed to the sleeve shaft is a sun gear 30s of a left output planetary gear set, generally indicated at 30. Sun gear 20s of right output planetary gear set 20 meshes with a set of planetary pinion gears 20p mounted on a planetary carrier 20c which is seen to be directly connected to the right output shaft 32 of transmission 8. Sun gear 30s of left output planetary gear set 30 meshes with a set of planetary pinion gears 30p mounted on a planetary carrier 30c which is directly connected to the left transmission output shaft 34 of transmission 8. Ring gear 20r of right output planetary gear set 20 and ring gear 30r of left output planetary gear set 30 are mechanically tied together by a cross-shaft 36. Affixed to this cross shaft is a disk 38 which is engagable by a first range forward-/reverse brake BI(R).

Completing the description of the drive system structure schematically illustrated in FIG. 1, pinion gear 12 carried by shaft 10 of motor M2 drives a spur gear 40 carried on one end of a sleeve cross-shaft section 42a which is drivingly engageable with an axially aligned, sleeve cross-shaft section 42b by a second range clutch CII. The other end of sleeve shaft section 42b carries a second sun gear 30s' included in left output planetary gear set 30. This second sun gear meshes with a second set of planetary pinion gears 30p' which is also mounted on carrier 30c in meshing engagement with the set of pinion gears 30p.

To describe the operation of transmission 8 illustrated in FIG. 1, reference is also be made to FIG. 2 which is a graphical illustration of the motions of the various elements included in the left and right output planetary gear sets 30 and 20. Vertical lines 50 and 51 represent the operations of sun gear 30s and carrier 30c, respectively, of left output planetary gear set 30, while vertical lines 52 and 53 represent the operations of sun gear 20s and carrier 20c, respectively, of right output planetary gear set 20. The single line 54 can represent the operations of both output planetary gear set ring gears 20r and 30r since they are interconnected by cross shaft 36. The X axis line 55 represents zero revolutions per minute (RPM) for the various planetary gear set elements. Points above the X axis 55 will be assumed to represent relative angular velocities (RPM) of the various planetary gear elements in the forward propulsion direction, with points below the X axis then representing relative element angular velocities in the reverse propulsion direction. The separation 56 between vertical lines 50 and 51 is proportional to the number of teeth on ring gear 30r. The separation 57 between vertical lines 51 and 54 is then proportional to the number of teeth on sun gear 30s. Similarly, the separation 58 between vertical lines 52 and 53 is proportional to the number of teeth on ring gear 20r, while the separation 59 between vertical lines 53 and 54 is proportional to the number of teeth on sun gear 20s. Since separations 56 and 57 are respectively equal to separation 58 and 59, the gear ratios of the two output planetary gear sets 20 and 30, represented thereby, are equal.

With first range brake BI(R) released and second range clutch CII disengaged, there is no reaction to the mechanical input from motor M2 applied to sun gear 20s and the input from motor M1 applied to sun gear 30s, and thus the transmission is operating in neutral or idle. To shift into the first speed range, brake BI(R) is engaged to ground cross shaft 36 and the ring gears 20r and 30r interconnected thereby. This fixes the common positions of these ring gears at point 54a on X axis 55, since their angular velocities are zero. It is a characteristic of the planetary gear set graphical representation of FIG. 2 that the angular velocities indicated by various points o the vertical lines of the graph always align themselves in a straight line. Thus, if sun gear 30s is driven by motor M1 in the forward propulsion direction up to an angular velocity corresponding to point 50a on vertical line 50, a straight line 60 drawn between points 50a and 54a intersects vertical line 51 at point 51a which represents the forward propulsion angular velocity of planetary carrier 30c, which, as seen in FIG. 1, is connected to the left transmission output shaft 34. Similarly, when sun gear 20s is driven by motor M2 up to the same angular velocity as sun gear 30s, as represented by point 52a, straight line 61 drawn between this point and point 54a establishes the forward propulsion angular velocity of right transmission output shaft driving planetary carrier 20c at point 53a. Since, as noted above, the ratios of the two output planetary gear sets are equal, points 51a and 53a lie on horizontal line 62 to indicate that the forward propulsion angular velocities of planetary carriers 30c and 20c are equal, and the vehicle is propelled forwardly in a straight line.

Similarly, when the driving direction of motors M1 and M2 is reversed, sun gears 30s and 20s are driven in the opposite or reverse propulsion direction with uniformly increasing angular velocities down to points 50b and 52b, straight lines 63 and 64 drawn between these points and point 54a establish the locations of points 51b and 53b which are horizontally aligned to indicate equal reverse propulsion angular velocities imparted to planetary carriers 30c and 20c. Thus output shafts 34 and 32 are driven at the same speed in the reverse direction. Assuming points 50a and 50b to represent the full forward and full reverse speeds of motor M1 and points 52a and 52b to represent the full forward and full reverse speeds of motor M2, double pointed arrows 65 and 66 represent the full extent of the first forward/reverse speed range of the transmission. As can be readily seen from FIG. 2, output speed in the first propulsion range, in both the forward and the reverse direction, is infinitely variable simply by uniformly varying the output speeds of motors M1 and M2.

To execute a steering maneuver, the output speed of one motor is increased by an amount determined in accordance with the sharpness of the steer desired, and the speed of the other motor is decreased by a like amount. This is seen from FIG. 2 to increase the slope of the straight line establishing the operating points of one output planetary gear set, while decreasing by an equal amount the slope of the straight line establishing the operating points for the elements of the other output planetary gear set. As a consequence, the angular velocity of one planetary carrier increases by a predeterimed amount, and the angular velocity of the other planetary carrier decreases by the same predetermined amount. The track laying vehicle thus executes the steering maneuver desired by the operator.

While brake BI(R) is engaged to operate the transmission in its first forward/reverse propulsion range, second range clutch CII is disengaged, and thus sun gear 30s' and pinion gears 30p' have no effect on left output planetary gear set 30 during first range propulsion. To shift into second range forward propulsion, brake BI(R) is released and clutch CII is engaged. This is seen to apply the output of motor M2 to sun gear 30s' of left output planetary gear set 30. Coincident with the engagement of clutch CII to shift into the second range, the output speeds of motors M1 and M2 are uniformly decreased such that the angular velocity of sun gear 30s is represented by point 50c and the angular velocity of sun gear 20s is represented by point 52c. Horizontal line 62 shows that these points 50c and 52c are horizontally aligned with points 51a and 53a, the latter two points representing the angular velocities of carriers 30c and 20c at substantially the upper limits of the first range forward propulsion speed. To satisfy the straight line rule for the angular velocities of the elements of a planetary gear set, the angular velocity of the interconnected ring gears 30r, 20r must be shifted from its first range braked position corresponding to point 54a to point 54b lying on horizontal line 62. This indicates that the angular velocities of sun gears 20s, 30s, carriers 20c, 30c, and ring gears 30r, 20r, are all the same upon shifting into the second forward propulsion range, assuming a steering maneuver is not being executed. That this indeed is the case can be seen from the schematic axial view of left output planetary gear set 30 illustrated in FIG. 3. Assuming sun gears 30s and 30s' are driven in the counterclockwise direction as illustrated by the arrows, their respective planetary pinion gears 30p and 30p' would tend to be driven in clockwise directions as indicated by the arrows. However since these pinion gears 30p and 30p' are in intermeshing relation, as indicated at 31, such clockwise rotations are inhibited so long as the angular velocities of sun gears 30s and 30s' are equal. Under this condition, the common planetary carrier 30c for pinion gears 30p and 30p' is forced to rotate in the counterclockwise direction at the same angular velocity as sun gears 30s and 30s'. This satisfies the position of point 51a in FIG. 2. Also, since pinion gears 30p do not rotate, a direct drive is established between sun gear 30s and ring gear 30r, and thus the latter is driven at the angular velocity of sun gear 30s. This brings ring gear 30r up in speed from its point 54a first range braked position to point 54b on horizontal line 62 to satisfy the straight line rule.

It will be appreciated that the same conditions prevail in the right output planetary gear set 20 since its ring gear 20r is driven via cross shaft 36 at the same angular velocity as ring gear 30r of left output Planetary gear set 30, and sun gear 20s is driven by motor M2 at the same angular velocity as sun gear 30s is driven by motor M1, assuming a steering maneuver is not being executed. Consequently, pinion gears 20p do not rotate, and a direct drive is establish between sun gear 20s and carrier 20c such that the latter revolves at the same angular velocity as sun gear 20s. Thus, the angular velocities of carriers 20c and 30c are equal, as confirmed in FIG. 2, in that points 53a and 51a are seen to lie on horizontal line 62. This horizontal line relationship of the velocity operating points for sun gears 20s, 30s, carriers 20c, 30c and ring gears 20r, 30r continues throughout the second forward propulsion speed range as the motors M2 and M1 are uniformly increased in speed. Thus, horizontal line 62 is progressively shifted upwardly through horizontal line positions indicated by the dash lines 62a, 62b and 62c, and double pointed arrows 70 and 71 represent the range of the transmission output speeds on left output shaft 34 and right output shaft 32 achievable in the second forward propulsion range. Again, forward propulsion speed is infinitely variable throughout the second range.

It should be mentioned that, in practice, the upper limits of the first and second ranges illustrated in FIG. 2 would correspond, for example, to approximately eighty percent of the maximum speed capability of motors M1 and M2, thereby making available additional motor speed variations for steering at the upper limits of first and second range forward propulsion.

In the graph of FIG. 4 which shows the relationship between motor M1, M2 speed in RPM and vehicle speed in miles per hour (MPH), straight line 72 illustrates the motor speed-vehicle speed relationship in the first forward propulsion range, while straight line 73 illustrates this relationship in the second forward propulsion range. Dash line 74 represents the shift from the first forward propulsion range to the second forward propulsion range, wherein, as described above, the speeds of motors M1 and M2 are uniformly decreased incident with this range shift.

Still to be considered is the operation of the transmission to execution of a steering maneuver during second forward propulsion range. As set forth above in the description of a steering maneuver in the first propulsion range, vehicle direction change is effected by increasing the speed of one motor M1, M2 by a prescribed amount, and at the same time decreasing the output speed of the other motor by the same prescribed amount. In so doing, the speed of one transmission output shaft 34 increases by a corresponding prescribed amount, while the angular velocity of the other transmission output shaft decreases by the same prescribed amount. It is important that this same convention be made to apply during second range forward propulsion. From FIG. 2, it can be seen that this is indeed achieved if the angular velocity of the interconnected ring gears 20r, 30r is not affected by an incremental increase in the speed of one motor in concert with the same incremental decrease in the speed of the other motor. That is, as long as the angular velocity of the common ring gears is insensitive to this imposed motor speed differential, the straight line connecting the sun gear 30s velocity point and the sun gear 20s operating point is simply rocked about the common ring gear velocity point which serves in the manner of a fulcrum. Since the ratios of the left and right output planetary gear sets are equal, the positions of vertical lines 51 and 53, representing carriers 30c and 20c, respectively, and the positions of vertical lines 50 and 52, representing sun gears 30s and 20s, respectively, are symmetrical about line 54 representing the interconnected ring gears 30r, 20r. Consequently, as the straight line interconnecting the two sun gear operating points and the common ring gear operating point is rocked about the common ring gear operating point, it is seen that the angular velocity of one carrier increases, while the angular velocity of the other carrier decreases by an equal amount. For example, if motor M1 is driving sun gear 30s at an angular velocity represented by point 50d, and motor M2 is driving sun gear 20 at the same angular velocity, as represented by point 52d, straight dash line 62b is horizontal, and thus point 51c, representing the angular velocity of carrier 30c, point 53c, representing the angular velocity of carrier 20c, and point 54c, representing the angular velocity of the common ring gears 30r, 20r, all lie on this horizontal line 62b, indicating that the angular velocities of all of the output planetary gear elements are equal. Now if the output speed of motor M1 is increased such that the velocity point of sun gear 30s is increased to point 50a as the output speed of motor M2 is decreased to reduce the angular velocity of sun gear 20s to point 52e, dashed horizontal straight line 62b is rocked about ring gear operating point 54c to assume the solid line position indicated at 76 which remains a straight line interconnecting points 50a, 54c and 52e. As a result, the angular velocity of carrier 30c is increased to bring its operating point up into alignment with line 76, while the angular velocity of carrier 20c is decreased by the same amount to bring its operating point also into alignment with straight line 76. In the same manner, if angular velocity of sun gear 30s is reduced from operating point 50d to operating point 50e while the angular velocity of sun gear 20s is increased from operating point 52d to operating point 50a, straight horizontal dash line 62b is rocked about the common ring gear operating point 54c to a solid line position indicated at 77. It is then seen that the carrier 30c operating point 51c is shifted downwardly and the operating point of carrier 20c is shifted upwardly such that they both lie on solid line 77. Thus, the angular velocity of carrier 30c is decreased and the angular velocity of carrier 20c is increased by an equal amount to execute a steer in the opposite direction.

From the foregoing description, it is appreciated that, for the angular velocity of the common ring gears 30r, 20r to remain unchanged during a steering maneuver, it must be propelled at an angular velocity which is equal to the average of the velocities of sun gears 30s and 20s. This velocity averaging function for the common ring gears is achieved in a unique and expeditious fashion with the illustrated construction of the left output planetary gear set 30.

Referring again to FIG. 3, if, as described above, the angular velocities of sun gears 30s and 30s' are equal, the planetary pinion gears 30p and 30p' do not rotate, and thus a direct drive relationship is established between the sun gears and both planetary carrier 30c and ring gear 30r for straight ahead second range propulsion. If the clockwise rotational velocity of sun gear 30s' is increased by a given amount at the same time that the clockwise rotational velocity of sun gear 30s is decreased by the same given amount, the result is that pinion gears 30p' are driven to rotate in clockwise direction, while pinion gears 30p are driven into the rotation in the counterclockwise direction. This causes the angular velocity of carrier 30c to decrease by an amount proportional to the difference in the angular velocities of sun gears 30s and 30s'. However, since carrier 30c is still revolving in the counterclockwise direction while pinion gears 30p are being rotated in the counterclockwise direction, the velocity increment imparted to ring gear 30 by the rotation of pinion gears 30p exactly offsets the affect of the decrease in carrier 30c angular velocity on the ring gear 30r angular velocity. It is thus seen that when the angular velocity of sun gear 30s' is increased by the same amount that the angular velocity of sun gear 30s is decreased, ring gear 30r is driven at an angular velocity which is the average of the two sun gear velocities and thus, under these circumstances, it is unchanged during a steering maneuver. From FIG. 2 it is seen that increasing the angular velocity of sun gear 30s' and decreasing the angular velocity of sun gear 30s' by the same amount creates the situation wherein the velocity points of the various elements of the two output planetary gears all lie on straight line 77.

Returning to FIG. 3, if the angular velocity of sun gear 30s is increased by the same amount that the angular velocity of sun gear 30s' is decreased, planetary gears 30p are driven into rotation in the clockwise direction, while planetary gears 30p' are driven to rotate in the counterclockwise direction. The angular velocity of carrier 30c is thus increased. However, the clockwise rotation of pinion gears 30p exactly offsets the effect of this carrier angular velocity increase on ring gear 30r such as to maintain the counterclockwise angular velocity of the ring gear unchanged. This corresponds to operating the elements of the left and right output planetary gear sets with velocity points all lying on line 76 of FIG. 2.

To graphically illustrate the above-described operation of left output planetary gear set 30, reference is made to FIG. 5 wherein the vertical operating lines 50, 51 and 54 for sun gear 30s, carrier 30c and ring gear 30r, respectively, are reproduced in the same manner as in FIG. 2. Also reproduced are planetary gear operating lines 62b, 76 and 77. It will be noted that the vertical scale in FIG. 5 has been expanded from that in FIG. 2 for illustration purposes. The significant difference in FIG. 5 is that, rather than graphically illustrating the right planetary gear set, vertical operating line 80 for sun gear 30s' is illustrated. As will be seen, in order to achieve the above-described, requisite operation of left output planetary gear set 30, the horizontal separation between the ring gear 30r vertical operating line 54 and sun gear 30s' operating line 80 on the one hand, and the horizontal separation between the ring gear operating line and sun gear 30s vertical operating line 50 must be equal. This then establishes the requisite number of teeth on sun gear 30s' (diameter) in order to achieve the requisite motor M1, M2 speed averaging or steer cancellation effect on the interconnected ring gears 20r, 30r during a second range steering maneuver. That is, the relationship of the number of teeth on sun gear 30s' to the number of teeth on ring gear 30r is represented by the length of double pointed arrow 82 corresponding to the horizontal separation between the sun gear 30s' vertical operating line 80 and the carrier 30c vertical operating line 51. Thus, the length of arrow 82 is Proportional to the number of teeth on ring gear 30r to the sum of the teeth on ring gear 30r and sun gear 30s'. As seen from a comparison of the lengths of arrows 82 and 56 in FIG. 5, sun gear 30s' has a proportionately smaller number of teeth than does sun gear 30s. Once the two output planetary gear set ratios are selected, the requisite number of teeth on sun gear 30s' can be determined from the following equation:

$$\frac{S \cdot R}{2S + R}$$

where
 S = number of teeth on sun gear 30s, and
 R = number of teeth on ring gear 30r. Thus, by way of example, if ring gear 30r has twice as many teeth as sun gear 30s, sun gear 30s must be half the size or have one half the number of teeth as sun gear 30s.

The above described operation of left output planetary gear set 30 can be confirmed from the graphical illustration of FIG. 5. Assuming the transmission is being operated in straight ahead second range propulsion corresponding to straight horizontal dash line 62b when a steering maneuver is to be effected, if the angular velocity of sun gear 30s increased from point 50d to point 50a on vertical line 50 at the same time that the angular velocity of sun gear 30s is decreased an equal amount from operating point 52d to operating point 52e in vertical line 80, then the left output planetary gear set 30 is operating on straight line 76, as was described above in connection with FIG. 2. It is seen in FIG. 5 that the angular velocity of planetary carrier 30c is increased by amount indicated by arrow 84, yet the angular velocity of ring gear 30r remains unchanged. Operating line 76 is the position assumed by operating line 62b upon being rocked in the clockwise direction about point 54c acting as a fulcrum. In the same manner, if the angular velocity of sun gear 30s is decreased from operating point 50d to operating point 50e while the 52d to point 52a, and the left output planetary gear set 30 is then operating on straight line 77, which is, in effect, the position of operating line 62b after having been rocked in the counterclockwise direction about the fulcrum of ring gear 30r operating point 54c. The angular velocity of planetary carrier 30c is thus decreased by the amount indicated by arrow 86. As was described in connection with FIG. 2, the increment of velocity increase imparted to planetary carrier 30c is equal to the increment of decreased velocity imparted to planetary carrier 20c of the right output planetary carrier 20, and vice versa, all as explained above.

From the foregoing description, it is seen that the present invention provides a drive system for tracklaying vehicles which utilizes two separate, independently controllable motors M1 and M2 as the power source, rather than a single prime mover. These motors may be of relatively low power capacity and thus less costly than a single prime mover. To implement these separate motor drives, the invention further provides a multi-range, infinitely variable transmission 8 with integral, internal steering capability. This transmission is eminently suited to take the utmost advantage of the cost-savings and improved efficiency afforded by the utilization of the separate drive motors. Transmission 8 is constructed of a minimum number of parts and provides continuous steering even during range shifting due to the permanent interconnection of ring gears 20r and 30r afforded by cross-shaft 36. This steering power path is devoid of clutches, and thus steering is positive and reliable. Steering torque is the same in both ranges, consequently the motors are not overloaded when second range steering maneuvers are executed. Moreover, output planetary gear set 30 is uniquely constructed not only to provide for second range forward propulsion, but also steer cancellation during a second range steering maneuver. Consequently, operator handling during a steer is consistent from speed range to speed range.

It is thus seen that the objects set forth above, including those made apparent from the preceding description are efficiently attained, and, since certain changes may be made in the disclosed embodiment without departing from the scope of the invention, it is intended that all matter contained in the above description and shown in the accompanying drawing shall be interpreted as illustrative and not in a limiting sense.

Having described the invention, what is claimed as new and desired to secure by Letters Patent is:

1. A drive system for a track-laying vehicle comprising, in combination:
   A. a first motor for providing a bidirectional first mechanical input infinitely variable in speed over a predetermined range;
   B. a second motor similar to and independent of said first motor for providing a bidirectional second mechanical input infinitely variable in speed over an essentially identical predetermimed range; and
   C. a transmission having first and second track driving outputs, and including
     (1) a first output gear set drivingly connected to said first transmission output,
     (2) a second output gear set drivingly connected to said second transmission output,
     (3) first means interconnecting said first and second output gear sets,
     (4) second means applying said first mechanical input to said first output gear set, said first mechanical input providing both steering power and propulsion power to said first output gear set,
     (5) third means applying said second mechanical input to said second output gear set, said second mechanical input providing both steering power and propulsion power to said second output gear set,
     (6) fourth means conditioning said first and second output gear sets to respectively produce first range propulsion and steering power at said first and second transmission outputs, and
     (7) fifth means operating in coordination with said fourth means to apply said first mechanical input to said second output gear set to produce second range propulsion power and first range steering power at said first range and second transmission outputs.

2. The drive system defined in claim 1, wherein said first and second output gear sets are first and second planetary gear sets, respectively.

3. The drive system defined in claim 2, wherein said first planetary gear set includes as operating elements a first sun gear, a first ring gear, a first planetary carrier, and a first pinion gear set mounted on said first planetary carrier, and wherein said second planetary carrier includes as operating elements a second sun gear, a second ring gear, a second planetary carrier, and a second pinion gear set mounted on said second planetary carrier.

4. The drive system defined in claim 3, wherein corresponding operating elements of said first and second planetary gear sets are respectively drivingly connected to said first and second transmission outputs, and said first means is a cross-shaft interconnecting corresponding other operating elements of said first and second planetary gear sets.

5. The drive system defined in claim 4, wherein said first and second planetary carriers are respectively drivingly connected to said first and second transmission outputs, and said cross-shaft interconnects said first and second ring gears.

6. The drive system defined in claim 5, wherein said second means applies said first mechanical input to said first sun gear, said third means applies said second mechanical input to said second sun gear, and said fourth means is a brake for grounding said cross-shaft to produce first range propulsion and steering power at said first and second transmission outputs.

7. The drive system defined in claim 6, wherein said second pinion gear set meshes with said second sun gear and said second ring gear, and said second planetary gear set further includes
   (1) a third pinion gear set mounted on said second planetary carrier in meshing engagement with said second pinion gear set,
   (2) a third sun gear meshing with said third pinion gear set, and
   (3) said fifth means includes a clutch for applying said first mechanical input to said third sun gear.

8. The drive system defined in claim 7, wherein said clutch is engaged concurrently with the release of said brake to produce second range propulsion power and first range steering power at said first and second transmission outputs.

9. The drive system defined in claim 8, wherein said first and second planetary gear sets are of an identical gear ratio and wherein to achieve effective steer cancellation in said second propulsion range, the number of teeth on said third sun gear is determined by the formula $$\frac{S \cdot R}{2S + R}$$

where S is the number of teeth on each of said first and second sun gears, and R is the number of teeth on each of said first and second ring gears.

10. In a drive system for a track-laying vehicle powered by first and second independent, similar motors each developing respective bidirectional first and second propulsion and steering power inputs variable in speed over a corresponding range a multi-range, infinitely variable steering transmission comprising, in combination:
  A. a first track driving transmission output;
  B. a second track driving transmission output;
  C. a first planetary gear set driven by said first input and drivingly connected with said first transmission output;
  D. a second planetary gear set driven by said second input and drivingly connected with said second transmission output;
  E. first means interconnecting said first and second planetary gear sets;
  F. second means selectively acting on said first means to produce propulsion and steering power at said first and second transmission outputs during a first forward and reverse speed range; and
  G. third means operating in coordination with said second means to selectively apply said first input to said second planetary gear set to produce propulsion and steering power at said first and second transmission outputs during a second forward speed range.

11. The transmission defined in claim 10, wherein said second planetary gear set includes a first gear element to which said first input is selectively applied and a second element to which said second input is applied, said second planetary gear set operating to produce angular motion on said first means of a speed equal to the average of the speeds of said first and second inputs.

12. The transmission defined in claim 11, wherein said first means is a cross-shaft, and said second means is a brake for selectively engaging and grounding said cross-shaft.

13. The transmission defined in claim 12, wherein said third means is a clutch selectively operable to apply said first input to said first element of said second planetary gear set in coordination with the disengagement of said cross-shaft by said brake.

14. The transmission defined in claim 13, wherein said first planetary gear set includes a first sun gear to which said first input is applied, a first ring gear, a first planetary carrier drivingly connected with said first transmission output, and a first set of pinion gears mounted on said first planetary carrier in meshing engagement with said first sun gear and said first ring gear, and said second planetary gear set includes a second ring gear, said cross-shaft interconnecting said first and second ring gears.

15. The transmission defined in claim 14, wherein said first and second elements of said second planetary gear set are second and third sun gears, respectively, said second planetary gear set further including a second planetary carrier drivingly connected with said second transmission output, a second set of pinion gears mounted on said second planetary carrier in meshing engagement with said third sun gear and said second ring gear, and a third set of pinion gears mounted on said second planetary carrier in meshing engagement with said second pinion gear set and with said second sun gear.

16. The transmission defined in claim 15, wherein the ratio of said first sun gear to said first ring gear is equal to the ratio of said third sun gear to said second ring gear.

17. The transmission defined in claim 16, wherein the number of teeth on said second sun gear is equal to $$\frac{S \cdot R}{2S + R}$$

wherein S equals the number of teeth on each of said first and third sun gears, and R equals the number of teeth on each of said first and second ring gears.

18. In a steering transmission for track-laying vehicles, a steer cancelling planetary gear set for developing a resultant angular velocity function equal to the average angular velocity of two mechanical inputs, said planetary gear set comprising, in combination:
  A. a first sun gear to which one of the mechanical inputs is applied;
  B. a second sun gear to which the other one of the mechanical inputs is applied;
  C. a ring gear;
  D. a planetary carrier;
  E. a first set of pinion gears mounted on said planetary carrier in meshing engagement with said first sun gear and said ring gear; and
  F. a second set of pinion gears mounted on said planetary carrier in meshing engagement with said first pinion gear set and said second sun gear, whereby said resultant angular velocity function is developed on said ring gear.

19. The planetary gear set defined in claim 18, wherein the number of teeth on said second sun gear is equal to $$\frac{S \cdot R}{2S + R}$$

where S equals the number of teeth on said first sun gear and R equals the number of teeth on said ring gear.

* * * * *